Sept. 19, 1933.　　　　　C. G. JOHN　　　　　1,927,345
BEAN SNIPPING MACHINE
Filed Oct. 3, 1932　　　　3 Sheets-Sheet 1

Inventor:
Chaucer G. John,
by A. P. Greeley
Att'y.

Sept. 19, 1933.  C. G. JOHN  1,927,345
BEAN SNIPPING MACHINE
Filed Oct. 3, 1932   3 Sheets-Sheet 3

Inventor:
Chaucer G. John,
by A. P. Greeley
Att'y.

Patented Sept. 19, 1933

1,927,345

UNITED STATES PATENT OFFICE 1,927,345

BEAN SNIPPING MACHINE

Chaucer G. John, Springdale, Ark., assignor to Chisholm-Ryder Co., Inc., Niagara Falls, N. Y.

Application October 3, 1932. Serial No. 636,054

12 Claims. (Cl. 146—86)

My invention relates to bean snipping machines, that is means for snipping or cutting off the blossom tip end and the stem end of bean pods and my invention has for its object to provide a simple and relatively inexpensive machine which will snip both ends of a bean pod in succession and that will effect the snipping of both ends of bean pods fed to it irrespective of the length.

A further object of my invention is to provide a bean snipping machine in which the continuous operation of a feeding means will first present a bean to snipping means by which its undesired ends will be cut off and will then present the snipped bean to cutters by which it will be severed into sections.

With the objects above indicated and other objects hereinafter described in view my invention consists in the construction and combination of elements hereinafter described and particularly pointed out in the claims.

Referring to the drawings:

Figure 6 is a side view of one of the star wheels.

Figure 1:
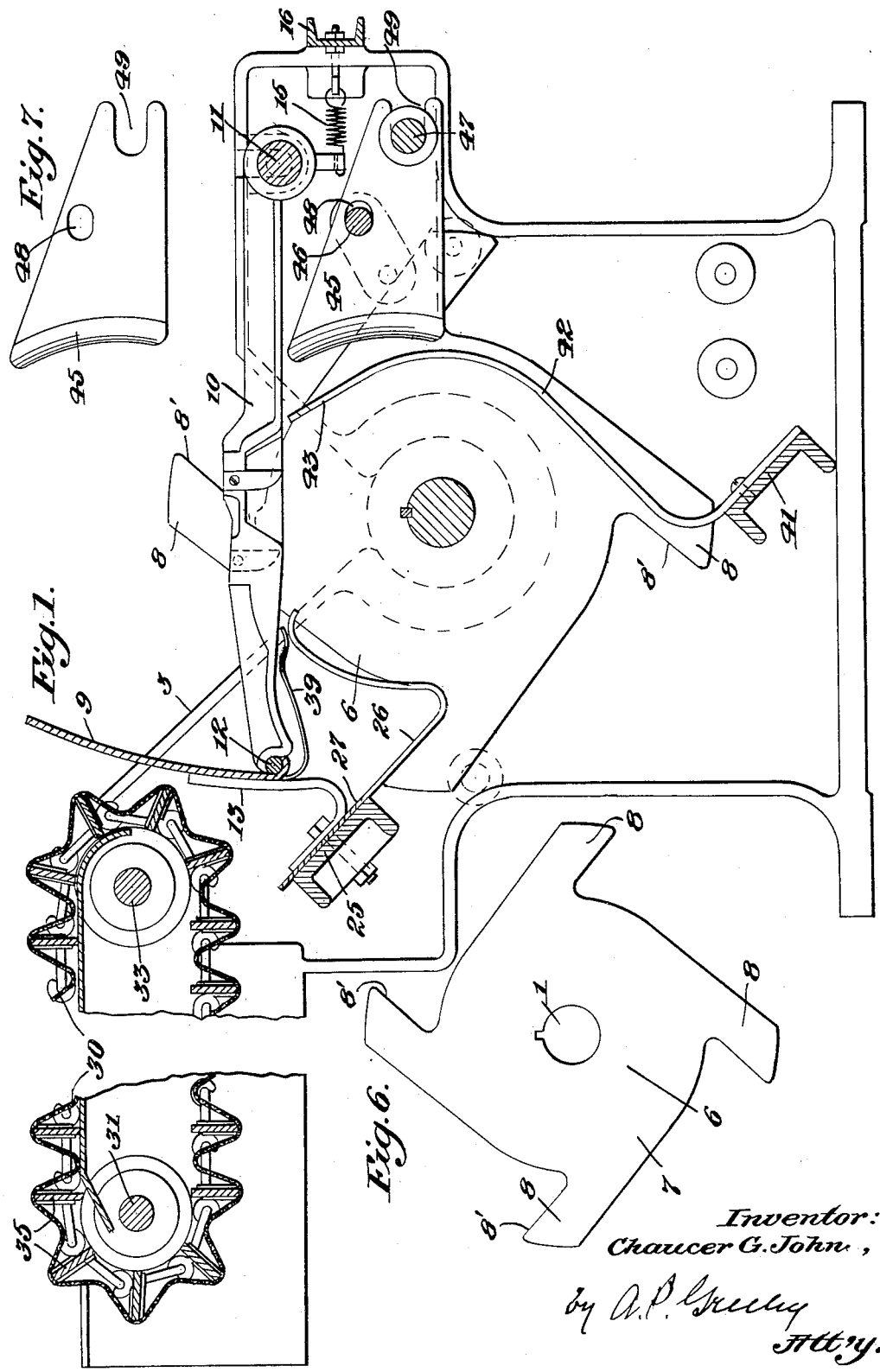
Figure 1 is a central, longitudinal, vertical, sectional view of a bean snipping machine embodying my invention.
Figure 2:
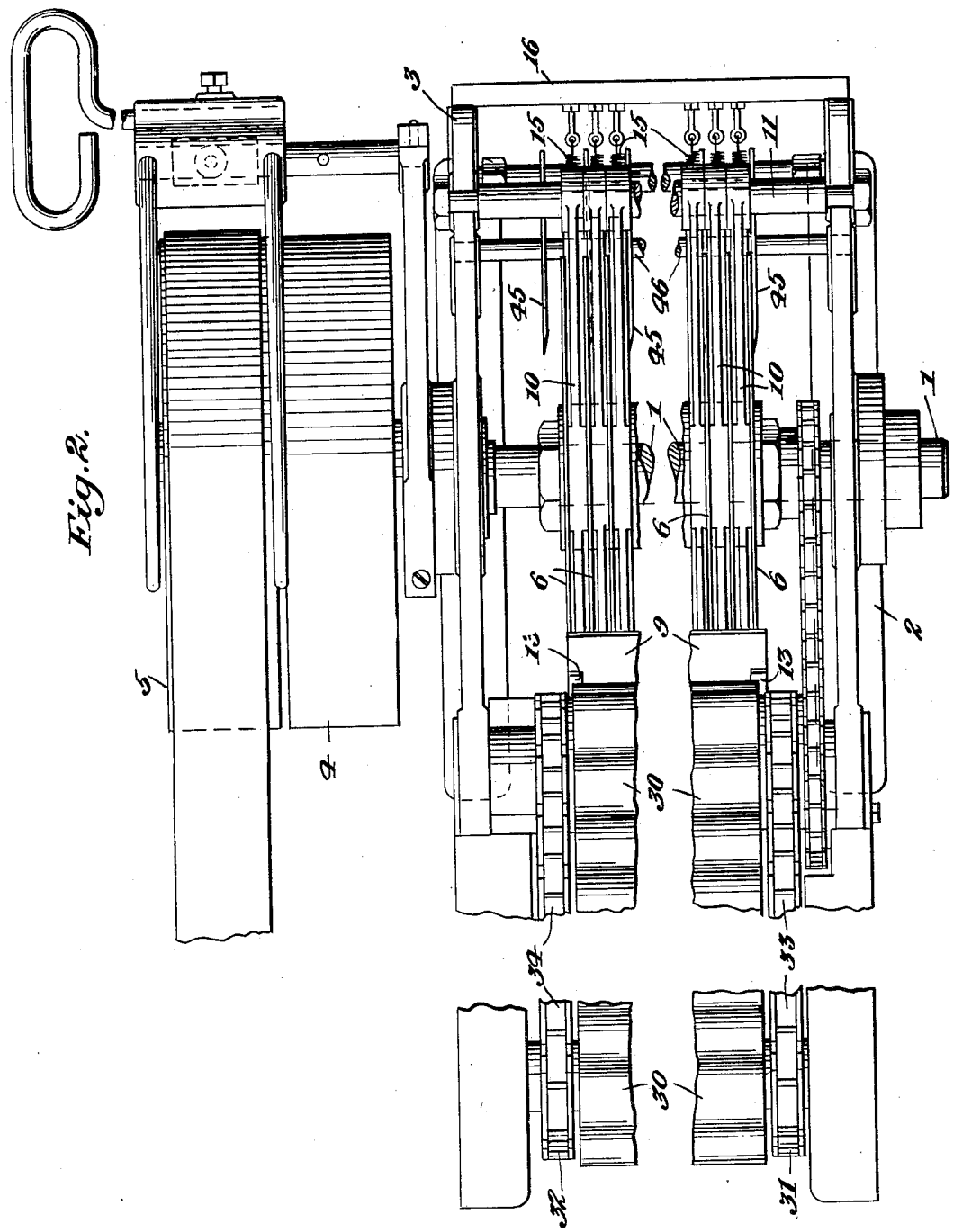
Figure 2 is a plan view partly broken away of the machine shown in Figure 1.
Figure 3:
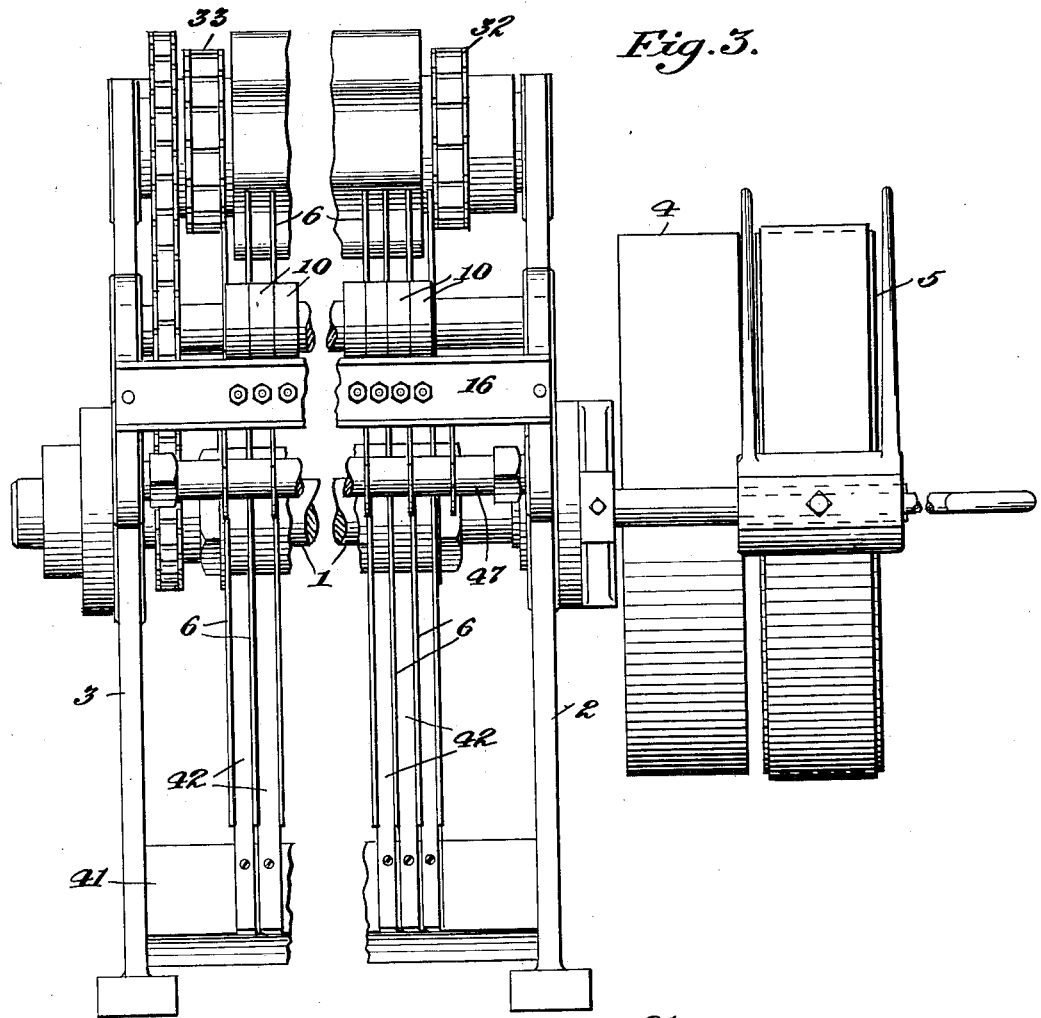
Figure 3 is a plan view showing the operating parts lying below the knife carrying arms.
Figure 4:
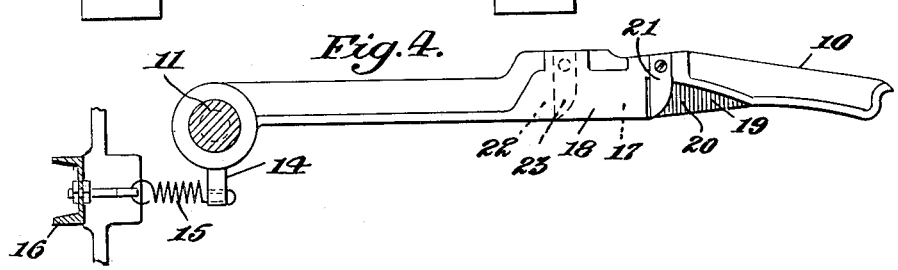
Figure 4 is a side view of a knife carrying arm.
Figure 5:
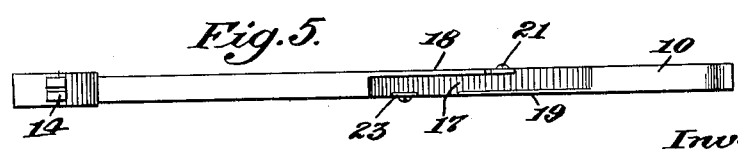
Figure 5 is a bottom plan view of the knife carrying arm shown in Figure 4.

In the drawings 1 indicated a shaft extending across the machine supported in suitable bearings in the sides 2 and 3 of the machine frame. This shaft as shown is provided on one end outside one of the frame sides with fast and loose pulleys 4 and 5 adapted to carry a driving belt. Between the frame sides 2 and 3 shaft 1 carries a series of star wheels 6 of sheet metal of suitable thickness equally spaced apart, each comprising a central disc 7 and radially extending arms 8, here shown as four in number. These discs 7 carrying arms 8 are fast on shaft 1 and the forward faces $8^1$ of these arms extend rearwardly at an acute angle to a radial line from the centre shaft 1. Above shaft 1 is arranged a series of knife carrying arms 10 pivoted at their rear ends on a rod 11 extending across the machine from frame side 2 to frame side 3 in rear of shaft 1 and having their rearward ends resting on rod 12 which extends across the machine and is supported at its ends by arms 13 and which are carried by cross bar 25 from which they extend rearward and upward. These arms 13 also carry an upwardly extending shield plate 9 which serves to direct beans coming from the feeding means downward so that they will be engaged by the arms of the star wheel, the shield also serving to prevent beans from falling onto the knife carrying arms.

Rod 11 and rod 12 are arranged in substantially the same horizontal plane and at such height above the shaft 1 that the lower edges of arms 10 will be normally only slightly below the plane of the peripheral portions of the disc 7 between arms 8. These arms 10 are free to swing on rod 11 and are each provided forward of rod 11 with a downwardly extending arm 14 the lower end of which is connected by coiled spring 15 with a bar 16 extending across the machine below rod 11, springs 15 being thus adapted to yieldingly hold the forward ends of arms 10 on rod 12.

To the upper face of cross bar 25 is secured a plate 27 which is slotted to form arms 26 which extend downward and rearward to points in line with the periphery of disc 7 and from these points extend upward and rearward to about the level of bar 12. These arms 26 are spaced apart so as to permit arms 8 of the star wheels to pass freely between them.

Knife carrying arms 10 are of substantial thickness, approximately seven sixteenths of an inch, and each is so formed or constructed as to have midway of its length an upwardly extending recess 17 between side plates 18 and 19. This recess 17 extends a substantial distance forward and rearward of the point of the arm which lies directly above the plane of the axis of shaft 1. Side plates 18 and 19 may be formed separate from and secured to arm 10 or as shown, may be integral therewith. Whether separately formed or integral with arm 10, these side plates are each provided with an upwardly extending notch and each carries in rear of the notch a knife. Side plate 18 has its notch 20 forward of the midlength of arm 10 with knife 21 in rear of the notch and side plate 19 has its notch 22 in rear of the midlength of the arm with knife 23 in rear of the notch. The forward edges of these knives are sharp and extend nearly or quite down to the lower edge of the plate 18 or 19 on which it is carried, or with which, if desired, it may be integral. The precise position of the notches 20 and 22 with reference to the midlength of arm 10 is not particularly important provided the notches in the two side plates are not in the same line transverse of the machine.

In operation a string bean pod resting on arms 26 and extending crosswise of the machine in position to be engaged by the forward edges 8¹ of arms 8 of starwheels 6 will be carried upward and, resting on the peripheries of discs 7 will be brought against the lower face of arm 10 forward of side plates 18 and 19 of such of the arms 10 as are within a space measured by the length of the bean, and will lift these arms against the resistance of springs 15 to the extent of the thickness of the portion of the bean which comes in contact with an arm. As the bean is carried forward its main or relatively thick portion, that is, all of it except its ends, will be brought into contact with the lower edges of one or the other, or both, of side plates 18 or 19 and as notches 20 and 22 are not in line the arm will be held up and cannot drop to permit this portion of the bean to be received in either of these notches to come in contact with a knife.

But as the series of knife carrying arms extends across the machine from side plate 2 to side plate 3, and the longest of the beans to be snipped are much less in length than the distance between the side plates any particular bean carried forward by arms 8 will effect the lifting of only part of these arms and the tapering portions of the bean will raise the arm 10 which is in the path of movement of this end portion only to the extent of the thickness of the tapered portion and as this tapered portion reaches notch 20, in plate 18, or notch 22 in plate 19, the arm will drop by its own weight aided by spring 15 and will bring knife 21, or knife 23 into the path of movement of the bean to cut off or snip the end off.

The beans should pass under knife carrying arms 10 singly and substantially parallel with the axis of the shaft 1 or as neary parallel as the more or less lack of straightness of the bean will permit. To effect such presentation of the bean I have arranged a feed belt 30 of the full width of the machine carried by sprocket wheels 31, 32, and 33, 34, and comprisng projecting bars 35 extending across the machine timed in operation to meet star wheel arms 8, and so arranged as to form between adjacent bars pockets to receive bean pods laid lengthwise of the pockets. A strip of canvas or other flexible material 36 preferably overlies the bars 35 to prevent the beans from contact with the bars.

Beans placed in these pockets will readily assume a position crosswise of the machine, that is, with their ends pointing towards the side frames 2 and 3, and, as the bars 35 pass over the rear sprocket wheels 33, 34, the beans will drop into the space forward of shield 9 and will fall into the trough formed by arms 28 which extend across the machine and in the trough so formed the beans rest until arms 8 of the star wheels coming up from below through the spaces between adjacent arms 28, lift the bean and carry it upward.

As a further means for ensuring that the beans will lie in a direction at right angles to the direction in which they are moved I attach to shield 9 a series of rearwardly and downwardly extending fine elastic wires 39 aptly termed "whiskers" extending into the path of movement of a bean as it is carried upward by the arms of the star wheel so as to offer sufficient resistance to ensure a straightening out of the bean and at the same time not sufficient to prevent its forward movement. These whiskers 39 are of such length that a bean will pass their ends just before it is brought in contact with the under faces of arms 10.

From cross bar 41, at the rear of the machine, curved arms 43 extend upward and forward each between adjacent star wheels 6 to points about in the plane of the highest point which the periphery of disc 7 reaches in its rotation and slightly below the plane of the lower edges of side plates 18 and 19 when the arms 10 are resting with their forward ends on ledge 12. The forward ends 43 of these arms are thus in position to catch the severed ends of the beans as they are cut off by knives 21 and 23 and to direct these snipped off ends to a point forward of cross bar 41.

The machine thus far described is complete for snipping beans if they are to be canned as full length beans. But string beans are often cut into short sections before canning and when they are to be so canned it is desirable to effect the snipping and the cutting into sections of equal length with the least possible short ends. In order to do this the machine is provided in rear of shaft 1 with a series of knives 45 carried by rods 46, 47, and extending into spaces between adjacent arms 8 of the star wheels, these knives 45 being suitably spaced on rods 46, 47, to cut sections of the length which may be desired and to come at least the thickness of a knife arm from the severed end. For the purpose of adjustment the knives are provided with openings 48 and 49 adapted to receive rods 46, 47, but of such size as to permit movement of the knives relative to the rods. The knives are secured in position on rods 46, 47, by any convenient means such as being clamped between spacing washers.

It will be understood that a bean which has been carried past the snipping knives will by the continued movement of arms 8 be brought into contact with knives 45 and cut into sections and these sections will by arms 42, 43, be directed rearward and away from the snipped off ends.

It will also be understood that the arms 8 of the star wheels are of such thickness as to so nearly fill the spaces between the sides of adjacent knife carrying arms 10 that they will serve as shearing blades with knives 21 and 23 and that the knives 45 will be so placed on their supporting rods as to be sufficiently close to the line of movement of arms 8 of a star wheel to permit of a shearing action between arm 8 and knife 45.

Having thus described my invention, what I claim is:—

1. In a machine for snipping string beans a knife carrying arm having between its ends opposite side plates having a space between them, said side plates each having a notch extending inward from its free edge, the notch of one side plate being out of line with the notch of the other side plates, each side plate being provided with a knife in rear of its notch, and means for moving a string bean along the free edges of the side plates.

2. In a machine for snipping string beans a forwardly extending knife carrying arm pivoted at one end so mounted as to be movable vertically, having between its ends opposite side plates having a space between them, said plates each having a notch extending inward from its free edge, the notch of one side plate being out of line with the notch of the other side plates, each side plate being provided with a knife in rear of its notch, means for supporting the free end of the knife carrying arm, and means for moving a string bean upward against the knife carrying arm and along the free edges of the side plates.

3. In a machine for snipping string beans a forwardly extending knife carrying arm pivoted at one end having between its ends opposite side plates having a space between them, said side plates each having a notch extending inward from its free edge, the notch of one side plate being out of line with the notch of the other side plates, each side plate being provided with a knife in rear of its notch, means for supporting the free end of the knife carrying arm, means for yieldingly holding the free end of the knife carrying arm in contact with its support, and means for moving a string bean upward against the free end portion of the knife carrying arm to swing it upward on its pivot and to move the string bean along the free edges of the side plates.

4. In a machine for snipping string beans a series of knife carrying arms arranged in parallelism each independently pivoted and each having between its ends oppositely arranged side plates having a substantial space between them, each side plate having a notch extending inward from its free edge, the notch of one side plate not being opposite the notch of the other side plate, each side plate having a knife in rear of its notch, and means for so forcing a bean pod against the free edges of the side plates of a plurality of the knife carrying arms, that the arms of which both side plates are contacted by the body portions of the bean pods will be swung on their pivots.

5. In a machine for snipping string beans a series of forwardly extending knife carrying arms arranged in parallelism, each independently pivoted and each having between its ends oppositely arranged side plates having a substantial space between them, each having a notch extending upward from its free edge, the notch of one side plate not being opposite the notch of the other side plate, each side plate having a knife in rear of its notch, and means for so forcing a bean pod upward against the free edges of the side plates of a plurality of the knife carrying arms that the arms of which both side plates are contacted by the body portion of the bean pod will be swung upward on their pivots.

6. In a machine for snipping string beans a series of forwardly extending knife carrying arms arranged in parallelism each independently pivoted and each having between its ends oppositely arranged downwardly extending side plates having a substantial space between them, each having a notch extending upward from its free edge, the notch of one side plate not being opposite the notch of the other side plate, each side plate having a knife in rear of its notch, and means for so forcing a bean pod upward against the free edges of the side plates of a plurality of the knife carrying arms, that the arms of which both side plates are contacted by the body portions of the bean pod will be swung upward on their pivots, said means for forcing a bean pod against the free edges of the side plates comprising a disc adapted to support the bean pod and a radial arm carried by the disc for forcing the bean pod rearward.

7. In a machine for snipping string beans a series of forwardly extending knife carrying arms arranged in parallelism with spaces between adjacent arms each independently pivoted at its rear end, each having a support for its forward ends, said arms having between their ends oppositely arranged, downwardly extending side plates having a substantial space between them, each having a notch extending upward from its free edge, the notch of one side plate not being opposite the notch of the other side plate and each side plate having a knife in rear of its notch, and means for so forcing a bean pod upward against the free edges of the side plates of a plurality of the knife carrying arms, that the arms of which both side plates are contacted by the body portions of the bean pod will be swung on their pivots, said means for forcing a bean pod against the lower edges of said side plates comprising a series of discs adapted to support the bean pod and radial arms carried by the discs for forcing the bean pod rearward, said discs being so spaced with reference to the knife carrying arms that their radial arms will enter a space between adjacent knife carrying arms.

8. In a machine for snipping string beans a series of forwardly extending knife carrying arms arranged in parallelism with spaces between adjacent arms each independently pivoted at its rear end, each having a support for its forward end, said arms having between their ends oppositely arranged, downwardly extending side plates having a substantial space between them, each side plate having a notch extending upward from its free edge, the notch of one side plate not being opposite the notch of the other side plate, and each side plate having a knife in rear of its notch, and means for so forcing a bean pod upward against and along the free edges of the side plates of a plurality of the knife carrying arms that the arms of which both side plates are contacted by the body of the bean pod will be swung on their pivots, said means for forcing a bean pod against the lower edges of said plates comprising a series of discs carried by a rotary shaft arranged below the knife carrying arm, said discs being adapted to support the bean pod, and radial arms carried by the discs for forcing the bean pod rearward, said discs being so spaced with reference to the knife carrying arms that their radial arms will enter a space between adjacent knife carrying arms.

9. In a machine for snipping string beans a series of forwardly extending knife carrying arms arranged in parallelism with spaces between adjacent arms each independently pivoted at its rear end, each having a support for its forward end, said arms having between their ends oppositely arranged, downwardly extending side plates having a substantial space between them, each side plate having a notch extending upward from its free edge, the notch of one side plate not being opposite the notch of the other side plate, each side plate having a knife in rear of its notch, and means for so forcing a bean pod upward against and slowly along the free edges of the side plates of a plurality of the knife carrying arms that the arms of which both side plates are contacted by the body of the bean pod will be swung on their pivots, said means for forcing a bean pod against and along the lower edges of said plates comprising a series of discs carried by a rotary shaft below the knife carrying arms, said discs being adapted to support the bean pods, and radial arms carried by the discs for forcing the bean pod rearward, said discs being so spaced with reference to the knife carrying arms that their radial arms will enter a space between adjacent knife carrying arms, and knives in rear of the shaft extending into spaces between adjacent discs.

10. In a machine for snipping string beans a series of forwardly extending knife carrying arms pivoted at one end, each having between its ends opposite side plates having a space between them, said side plates each having a notch extending inward from its free edge, the notch of one side plate being out of line with the notch of the other side plates, each side plate being provided with a knife in rear of its notch, and means for moving a string bean along the free edges of the side plates comprising a series of discs carrying radially extending arms extending into the spaces between adjacent knife carrying arms, and stationary knives extending into spaces between said discs.

11. In a machine for snipping string beans a series of forwardly extending knife carrying arms arranged in parallelism each independently pivoted and each having oppositely arranged side plates, each having a notch extending inward from the free end, the notch of one side plate not being opposite the notch of the other side plate, each side plate having a knife in rear of its notch, and means for so forcing a bean pod against and along the free edges of the side plates of a plurality of the knife carrying arms, that the arms of which both side plates are contacted by the body portion of the bean pod will be swung on their pivots, said forcing means comprising a series of discs carried by a shaft arranged below the knife carrying arms having radial arms extending into the spaces between adjacent knife carrying arms, and means for guiding string beans into position to be engaged by said radial arms carrying arms below the knife carrying arms extending rearward into spaces between said discs.

12. In a machine for snipping string beans a series of forwardly extending knife carrying arms arranged in parallelism each independently pivoted and each having oppositely arranged side plates, each having a notch extending inward from the free end, the notch of one side plate not being opposite the notch of the other side plate, each side plate having a knife in rear of its notch, and means for so forcing a bean pod against and along the free edges of the side plates of a plurality of the knife carrying arms, that the arms of which both side plates are contacted by the body portions of the bean pod will be swung on their pivots, said forcing means comprising a series of discs carried by a shaft arranged below the knife carrying arms, having radial arms extending into the spaces between adjacent knife carrying arms, and means for guiding string beans, into position to be engaged by said radial arms comprising arms below the knife carrying arms, extending rearward into spaces between said discs, and rearwardly extending elastic wires having their free ends in the path of movement of the beans carried by the radial arms of the discs.

CHAUCER G. JOHN.